United States Patent [19]

Eaton

[11] Patent Number: 5,672,038

[45] Date of Patent: Sep. 30, 1997

[54] FASTENER

[75] Inventor: Gary Garland Eaton, Troy, Mich.

[73] Assignee: Ford Global Technologies, Inc., Dearborn, Mich.

[21] Appl. No.: 772,235

[22] Filed: Dec. 23, 1996

Related U.S. Application Data

[63] Continuation of Ser. No. 559,859, Nov. 20, 1995, abandoned.

[51] Int. Cl.$^6$ ........................................................ F16B 19/00
[52] U.S. Cl. ............................... 411/510; 411/508; 411/908
[58] Field of Search ...................................... 411/451, 455, 411/456, 508, 510, 908, 913, 509

[56] References Cited

U.S. PATENT DOCUMENTS

| | | | |
|---|---|---|---|
| 170,190 | 11/1875 | Pratt . | |
| 2,058,020 | 10/1936 | Jaffe | 411/456 |
| 2,111,456 | 3/1938 | Markle, Jr. | 411/451 |
| 2,909,957 | 10/1959 | Rapata | 85/5 |
| 2,927,497 | 3/1960 | Rapata | 85/5 |
| 3,244,057 | 4/1966 | Mathison | 411/510 |
| 3,304,106 | 2/1967 | McCormack | 411/451 |
| 3,494,244 | 2/1970 | Wayland | 85/5 |
| 3,810,279 | 5/1974 | Swick et al. | 411/509 |
| 3,982,363 | 9/1976 | Dorris | 411/908 |
| 4,003,175 | 1/1977 | Petry | 52/506 |
| 4,214,505 | 7/1980 | Aimar | 411/510 |
| 4,402,641 | 9/1983 | Arff | 411/510 |
| 4,551,189 | 11/1985 | Peterson | 411/510 |
| 4,576,532 | 3/1986 | Hanson et al. | 411/352 |
| 4,900,210 | 2/1990 | Buchanan et al. | 411/508 |
| 4,976,578 | 12/1990 | Mathes et al. | 411/510 |
| 5,306,098 | 4/1994 | Lewis | 411/510 |
| 5,393,185 | 2/1995 | Duffy, Jr. | 411/510 |

FOREIGN PATENT DOCUMENTS

| | | | |
|---|---|---|---|
| 759613 | 11/1933 | France | 411/451 |
| 54433 | 11/1911 | Switzerland | 411/456 |
| 341761 | 11/1959 | Switzerland . | |
| 2077845 | 12/1981 | United Kingdom | 411/510 |

*Primary Examiner*—Steven N. Meyers
*Assistant Examiner*—Robert G. Santos
*Attorney, Agent, or Firm*—David B. Kelley; Roger L. May

[57] ABSTRACT

An injection molded fastener is provided for securing a preform to a foam substrate. The fastener includes a body having first and second ends with a head secured to the first end. A pilot section extends from the second end of the body, and includes a pointed end for penetrating and forming a hole in the preform and substrate. A plurality of angled barbs extend from the body for preventing removal of the fastener from the formed hole. The fastener is of sufficient strength to withstand a hammer blow and to penetrate the substrate when hammered. In a preferred embodiment, the fastener comprises a mineral filled nylon material.

7 Claims, 1 Drawing Sheet

FASTENER

This is a continuation of application Ser. No. 08/599,859, filed on Nov. 20, 1995 now abandoned.

TECHNICAL FIELD

The present invention relates to fasteners and, more particularly, to fasteners for attaching pre-forms to foam cores.

BACKGROUND OF THE INVENTION

Typically, when attaching vehicle structural members, such as fiberglass preforms and foam cores, it is necessary to provide attachment holes in the members to be attached for inserting a fastener therethrough. Such attachment holes require separate drilling or punching operations, which add to manufacturing costs. These holes also require dimensional accuracy for precise attachment of the adjacent members, which further adds to manufacturing costs. Known prior art fasteners require such predrilled/formed holes, even those prior art fasteners which are driven into position with a hammer. These predrilled holes are labor intensive and time consuming.

U.S. Pat. No. 4,003,175, the only known hammerable prior art Christmas tree type fastener which does not require a predrilled hole, comprises a two-piece construction with a metal tip for penetration. This two-piece construction requires an expensive insert-molding operation in which the body is molded around the metal tip.

Since inexpensive, yet effective, Christmas tree type fasteners are not available, current technology uses metallic staples for attachment of preforms to foam cores. These staples have poor retention characteristics, and loose staples will damage tools, fixtures and jigs when interfering with such equipment. Also, since the fasteners locate the preform relative to the foam core, failure of the fastening system results in inaccurate preform location, which results in scrapped parts.

SUMMARY OF THE INVENTION

The present invention overcomes the above-referenced shortcomings of prior art fastener systems by providing an injection molded fastener which may be hammered into position and does not require a premade hole. The fastener is of sufficient strength to withstand a hammer blow and to penetrate a substrate when hammered. The fastener is useful in attaching preforms to foam cores. The plastic fastener minimizes tool cost, minimizes labor and manufacturing costs, minimizes damage to tools and fixtures, and has significant retention strength and ease of penetration without crushing.

More specifically, the present invention provides an injection molded fastener for securing a first member to a substrate member, comprising a body having first and second ends, a head secured to the first end, and an extended pilot section secured to the second end. The pilot section includes a pointed end for penetrating and forming a hole in the substrate. A plurality of angled barbs extend from the body for preventing removal of the fastener. The fastener is of sufficient strength to withstand a hammer blow and to penetrate the substrate when hammered.

Another aspect of the present invention provides such a fastener for securing a fiberglass preform to a foam substrate. The pilot section includes a pointed end for penetrating and forming a hole in the fiberglass preform. A plurality of angled barbs extend from the body for preventing removal of the fastener by engaging the foam substrate. The fastener is of sufficient strength to penetrate the fiberglass preform when hammered.

Elimination of the preformed hole results in significant reductions in labor and manufacturing costs for manufacturers. Furthermore, this injection molded fastener is less expensive to manufacture than other forms of fasteners, particularly the two-piece fastener.

Accordingly, an object of the present invention is to provide an injection molded fastener for securing a fiberglass preform to a foam substrate, the fastener being of sufficient strength to withstand a hammer blow and to penetrate the substrate without the need for a preformed hole.

The above object and other objects, features and advantages of the present invention are readily apparent from the following detailed description when taken in connection with the accompanying drawings.

DETAILED DESCRIPTION OF THE PREFERRED EMBODIMENT

Figure 1:
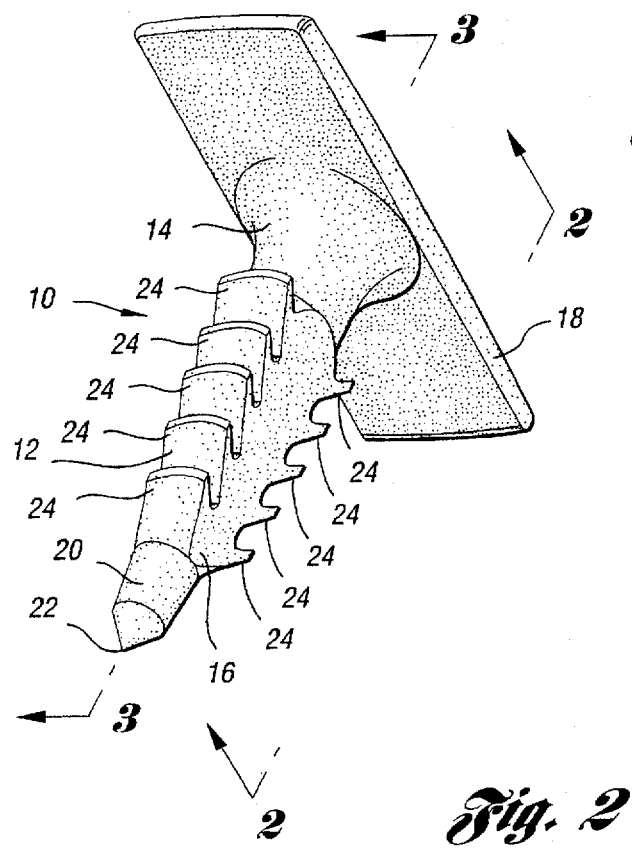
FIG. 1 shows a perspective view of a fastener in accordance with the present invention.
Figure 2:
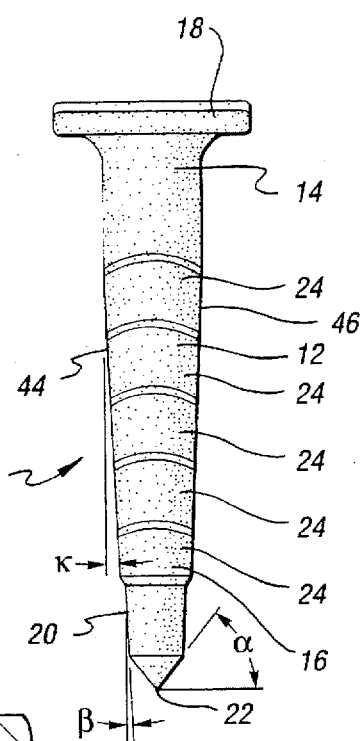
FIG. 2 shows vertical cross section of the fastener of FIG. 1 taken at line 2—2 of FIG. 1.
Figure 3:
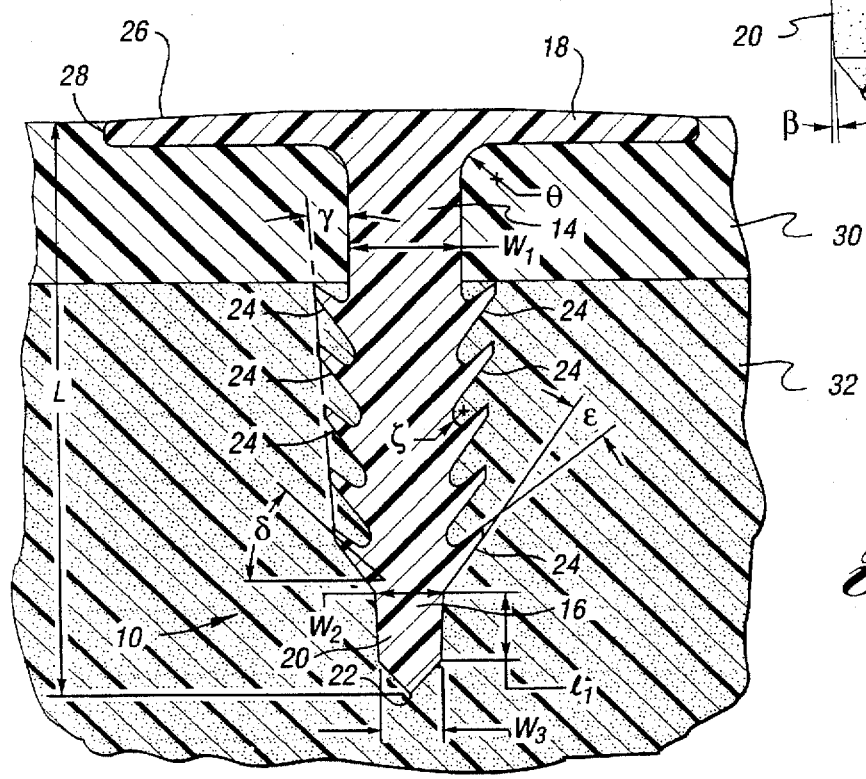
FIG. 3 shows a sectional view of the fastener of FIG. 1 taken at line 3—3 of FIG. 1, the fastener being inserted in a fiberglass preform and foam core.

FIGS. 1–3 show an injection molded fastener for securing a first member to a substrate member in accordance with the present invention. The injection molded fastener 10 includes a body 12 having first and second ends 14,16, respectively. A head 18 is secured to the first end 14 of the body 12. A pilot section 20 extends from the second end 16 of the body 12, and includes a pointed end 22 for penetrating and forming a hole in the substrate member.

A number of angled barbs 24 extend from the body 12 for preventing removal of the fastener.

The fastener has a body width ($W_1$) which is broader than the width ($W_2$) of the base of the pilot section 20. The pointed end 22 and pilot section 20 provide the function of penetrating the substrate and forming a hole therein before the barbs 24 and body 12 of the fastener 10 are introduced into the hole formed.

As shown in FIG. 2, the body 12 includes opposing substantially flat sides 44,46 to facilitate automated handling of the fastener.

The fastener 10 is of sufficient strength to withstand a hammer blow and to penetrate the substrate when hammered. Preferably, the fastener is of sufficient strength to penetrate a fiberglass substrate. A fastener in accordance with this design comprising a mineral filled nylon material, such as toughened DuPont 12T, a 36% mineral-filled nylon, is sufficient for such purpose. Of course, various injection molded materials could be used with the same effect.

The pointed end 22 of the pilot section 20 penetrates the fiberglass substrate 30, and the lead angle $\alpha$ helps to form a hole in the substrate 30. The pilot section 20 is tapered at an angle $\beta$ to further enlarge the formed hole. The pilot section 20 is of length ($L_1$). With $L_1$ equal to 3 mm, the pilot section 20 can fully penetrate a 3 mm fiberglass substrate, and the pointed end 22 begins to engage the foam core 32 before the barbs 24 enter the fiberglass substrate.

The distal ends of the barbs 24 are tapered at an angle γ so that each successive barb 24 engages new foam 32 as the fastener is inserted. When the leading barb engages foam, the barb compresses slightly while displacing some foam. Once the leading barb 24 has passed by a certain amount of foam, the barb expands outwardly, and the foam returns toward the barb slightly so that the distal end of the barb is engaged with the foam. Due to the taper γ of the barbs 24, each following barb engages foam which has been previously undisturbed. Accordingly, each barb 24 is engaged with its respective foam. Without the taper, the leading barb would displace the foam, and none of the following barbs would have foam available for engagement therewith. Each barb 24 is tilted at an angle δ and has opposing sides with a relative angle ε therebetween. The barbs 24 are undercut with an internal radius ζ, which provides strength to the barbs 24 to prevent stress fractures. Similarly, the head 18 has a large lead in radius θ to prevent stress fractures between the head 18 and the first end 14 of the body 12.

As shown in FIGS. 1 and 2, the barbs 24 are curved at their distal end portions in order to provide greater flexibility, and to facilitate tooling concerns.

The flat sides 44, 46 of the body 12 are tapered at an angle κ to further facilitate insertion. The flat sides 44, 46 are also provided for tooling concerns, and for directing foam to the lateral edges of the barbs 24. In this configuration the fastener has a pull strength of 25 pounds.

The top surface 26 of the head 18 has a crown shape to prevent the ends 28 of the head from lifting when the fastener 10 is hammered into a substrate. Of course, the fastener 10 could be driven to a position in which the top surface 26 of the head 18 is flush with the fiberglass substrate 30, substantially as shown in FIG. 3.

Table A below provides a listing of preferred dimensions for the fastener. Of course, these dimensions could vary within the scope of the present invention.

TABLE A

| | |
|---|---|
| α | 50.26° |
| β | 3° |
| γ | 4.146° |
| δ | 41° |
| ε | 14° |
| ζ | 0.014" |
| θ | 0.0625" |
| κ | 3° |
| $w_1$ | 0.200" |
| $w_2$ | 0.118" |
| $w_3$ | 0.100" |
| L | 1.0" |

The present invention provides a number of advantages to manufacturers. The cost of manufacturing the fastener is minimal because it is a one-piece injection molded component. Elimination of the typical prepunched hole saves considerable manufacturing time and expense. The ease of penetration of the fastener in accordance with the present invention facilitates hammerability, and also facilitates automated handling. The angled barbs 24 provide significant retention strength for holding adjacent members, such as a preform and foam core. Unlike staples and other fasteners, this injection molded fastener will not damage tools, fixtures and jigs when loose fasteners interfere with such tools because the injection molded fastener is relatively soft and flexible. This plastic fastener may also be less visible in a molded part than other known fasteners, such as staples, as the fastener may be molded in any desired color.

While the best mode for carrying out the invention has been described in detail, those familiar with the art to which this invention relates will recognize various alternative designs and embodiments for the present invention within the scope of the following appended claims.

What is claimed is:

1. A fastener for securing a first member to a substrate member, comprising:

a tapered body having first and second ends and opposing tapered flat sides;

a head secured to said first end of said body;

an extended pilot section extending from said second end of said body, and having a sharp pointed end for penetrating and forming a hole in the substrate member;

a plurality of angled barbs extending from said body for preventing removal of the fastener from the formed hole, said barbs having distal ends cooperating to form a taper such that each successive distal end extends further away from the body than the previous distal end for improved gripping; and said fastener being a one-piece injection molded part.

2. The fastener of claim 1, wherein said body has a body width, and said pilot section has a pilot width narrower than said body width.

3. The fastener of claim 1, wherein said fastener comprises mineral filled nylon.

4. A fastener for securing a fiberglass preform to a foam substrate, comprising:

a tapered body having first and second ends and opposing tapered flat sides;

a head secured to said first end of said body;

an extended pilot section extending from said second end of said body, and having a sharp pointed end for penetrating and forming a hole in the fiberglass preform;

a plurality of angled barbs extending from said body for preventing removal of the fastener from the formed hole, said barbs having distal ends cooperating to form a taper such that each successive distal end extends further away from the body than the previous distal end for improved gripping; and said fastener being a one-piece injection molded part.

5. The fastener of claim 4, wherein said body has a body width, and said pilot section has a pilot width narrower than said body width.

6. The fastener of claim 4, wherein said fastener comprises mineral filled nylon material.

7. An injection molded fastener for securing a fiberglass preform to a foam substrate, comprising:

a tapered body having a body width and first and second ends, and having opposing tapered flat sides;

a head secured to said first end of said body;

an extended pilot section extending from said second end of said body, said pilot section having a pilot width narrower than said body width, and having a sharp pointed end for penetrating and forming a hole in the fiberglass preform;

a plurality of angled barbs extending from said body for preventing removal of the fastener from the formed hole, said barbs having distal ends cooperating to form a taper such that each successive distal end extends further away from the body than the previous distal end for improved gripping; and said fastener comprising a one-piece injection molded mineral filled nylon material.

* * * * *